(12) United States Patent
Yamada (10) Patent No.: US 8,634,048 B2
(45) Date of Patent: Jan. 21, 2014

(54) LIQUID CRYSTAL DEVICE WITH CONTROLLED THICKNESSES RATIO OF INORGANIC LAYERS AND METHOD OF MANUFACTURING LIQUID CRYSTAL DEVICE

(75) Inventor: Shuhei Yamada, Chino (JP)

(73) Assignee: Seiko Epson Corporation, Tokyo (JP)

( * ) Notice: Subject to any disclaimer, the term of this patent is extended or adjusted under 35 U.S.C. 154(b) by 228 days.

(21) Appl. No.: 13/013,899

(22) Filed: Jan. 26, 2011

(65) Prior Publication Data

US 2011/0181822 A1    Jul. 28, 2011

(30) Foreign Application Priority Data

Jan. 27, 2010  (JP) .................................. 2010-015132

(51) Int. Cl.
*G02F 1/1337* (2006.01)

(52) U.S. Cl.
USPC .......................................... 349/125; 349/123

(58) Field of Classification Search
USPC ....................................................... 349/125
See application file for complete search history.

(56) References Cited

U.S. PATENT DOCUMENTS

| 6,922,224 B1 * | 7/2005 | Penry et al. .................... 349/138 |
| 7,038,748 B2 | 5/2006 | Sasaki |
| 2005/0052600 A1 | 3/2005 | Hashimoto et al. |
| 2006/0285036 A1 * | 12/2006 | Inoue et al. .................... 349/114 |

FOREIGN PATENT DOCUMENTS

| JP | 2005-49817 A | 2/2005 |
| JP | 2005077901 A | 3/2005 |
| JP | 2007-248743 A | 9/2007 |
| JP | 2009-103756 A | 5/2009 |
| JP | 2009-210766 A | 9/2009 |

* cited by examiner

*Primary Examiner* — Richard Kim
(74) *Attorney, Agent, or Firm* — Lowe Hauptman & Ham, LLP (57) ABSTRACT

A liquid crystal device according to embodiments of the invention includes a first alignment layer that is disposed on the first substrate and includes a second alignment layer that is disposed on the second substrate. The first alignment layer includes a first inorganic layer and a second inorganic layer which having a column-like structure with an orientation angle different from an orientation angle of the column-like structure of the first inorganic layer. The second alignment layer includes a third inorganic layer and a fourth inorganic layer which having a column-like structure with an orientation angle different from an orientation angle of the column-like structure of the third inorganic layer. The ratio of the thickness of the second inorganic layer to the thickness of the first inorganic layer is different from the ratio of the thickness of the fourth inorganic layer to the thickness of the third inorganic layer.

10 Claims, 7 Drawing Sheets

LIQUID CRYSTAL DEVICE WITH CONTROLLED THICKNESSES RATIO OF INORGANIC LAYERS AND METHOD OF MANUFACTURING LIQUID CRYSTAL DEVICE

BACKGROUND

1. Technical Field

The present invention relates to a liquid crystal device and a method of manufacturing the liquid crystal device.

2. Related Art

Typically, a liquid crystal device is used for a direct view-type display panel, a projector, or a viewfinder of a camera or the like. For example, a liquid crystal device has a configuration in which a liquid crystal layer is confined between a device substrate and a counter substrate. The device substrate has a plurality of pixel electrodes that are provided for respective pixels. The counter substrate has a common electrode that is shared by the pixels. The electric potential of each of the pixel electrodes is alternately switched between a high level and a low level with respect to a common potential on the basis of a drive voltage waveform while the common electrode is held at the common potential, and the liquid crystal layer is alternate current (AC)-driven for each of the pixels. In the case where the liquid crystal layer is driven, an alignment state of the liquid crystal layer is changed, and a polarization state of light that passes through the liquid crystal layer changes in accordance with the alignment state of the liquid crystal layer. The light that has passed through the liquid crystal layer is partially absorbed by a polarization plate in accordance with the polarization state with the result that light exhibiting a desired gray scale is produced, thereby contributing to displaying of an image.

In the case where a voltage is not applied, the alignment state of the liquid crystal layer is regulated by an alignment layer such as an organic alignment layer or an inorganic alignment layer. An inorganic alignment layer that is formed by a sputtering method or a vapor deposition method is superior to an organic alignment layer in terms of improvement of light resistance. Examples of a liquid crystal device in which an inorganic alignment layer is used include one of a type disclosed in JP-A-2009-210766.

In the liquid crystal device disclosed in JP-A-2009-210766, an inorganic alignment layer including a plurality of vapor-deposited layers is used. One of the vapor-deposited layers functions as an alignment layer that is formed so as to contact a liquid crystal layer. Another vapor-deposited layer is formed as the bottom layer at a deposition angle of 90°. The bottom vapor-deposited layer has a precise configuration, and therefore the reliability of the alignment layer can be enhanced.

In the case where imbalance is caused between the rise and fall of an effective voltage waveform with respect to a common potential, such imbalance causes a flickering, image burning, or the like, the effective voltage waveform being applied to the liquid crystal layer. The following mechanism is thought to be a cause of the imbalance between the rise and fall of the effective voltage waveform.

In general, a structural difference is provided between the side of the device substrate and the side of the counter substrate. A force with which impurities (such as impurity ions, especially) contained in the liquid crystal layer are attracted to the side of the device substrate is asymmetric to a force with which the impurity ions are attracted to the side of the counter substrate, each of the forces acting on the liquid crystal layer. Accordingly, the impurity ions are nonuniformly adsorbed to the side of the device substrate or to the side of the counter substrate, and the adsorbed impurity ions affect an electric field with the result that the effective voltage waveform is shifted. Consequently, a predetermined common potential becomes inadequate in terms of balance between the rise and fall of a voltage waveform.

For example, in order to overcome such a disadvantage, a technique disclosed in JP-A-2005-49817 can be employed. A reflective liquid crystal display device disclosed in JP-A-2005-49817 has a pixel electrode made of a light reflective material and has a common electrode made of light transmissive material. A work function-adjusting layer having a work function larger than that of the common electrode is formed on the pixel electrode. A work function obtained as a result of adding the work function of the pixel electrode to that of the work function-adjusting layer is configured so as to approach the work function of the common electrode.

In the technique disclosed in JP-A-2005-49817, imbalance between the rise and fall of the effective voltage waveform is assumed to be able to be precluded owing to a difference in the work functions between the pixel electrode and the common electrode. However, there is still room for improvement as described below.

For example, even in the case where the pixel electrode is made of the same material as the common electrode, nonuniformity of the impurity ions in the liquid crystal layer is caused. Namely, the nonuniformity of the impurity ions is generated resulting from causes other than the difference in the electrode materials, and therefore the technique disclosed in JP-A-2005-49817 has limitations regarding prevention of the nonuniformity of the impurity ions. Furthermore, the formation of the work function-adjusting layer causes disadvantages, such as the adjustment of the work function causing adverse effects on the electrical properties or display properties of the liquid crystal device, the device configuration becoming complicated, and the increased number of manufacturing processes causing decreased manufacturing efficiency.

SUMMARY

An advantage of some aspects of the invention is that it provides a liquid crystal device which is capable of decreasing a deviation of a common potential from the optimum value without a complicated device configuration and decreased manufacturing efficiency and that it provides a method of manufacturing the liquid crystal device.

In order to provide the above advantages, the following advantageous configurations are herein employed.

According to a first aspect of the invention, there is provided a liquid crystal device having a liquid crystal layer disposed between a first substrate and a second substrate, the liquid crystal device including: a first alignment layer that is formed on the first substrate at the side of the liquid crystal layer, the first alignment layer including two or more inorganic layers each having a column-like structure; and a second alignment layer that is formed on the second substrate at the side of the liquid crystal layer, the second alignment layer including two or more inorganic layers each having a column-like structure. The two or more inorganic layers of the first alignment layer include a first inorganic layer and a second inorganic layer, the second inorganic layer being disposed on the first inorganic layer at the side of the liquid crystal layer so as to contact the liquid crystal layer, the second inorganic layer having the column-like structure with an orientation angle different from an orientation angle of the column-like structure of the first inorganic layer. The two or more inorganic layers of the second alignment layer include a third inorganic layer and a fourth inorganic layer, the fourth inorganic layer being disposed on the third inorganic layer at the side of the liquid crystal layer so as to contact the liquid crystal layer, the fourth inorganic layer having the column-like structure with an orientation angle different from an orientation angle of the column-like structure of the third inorganic layer. A ratio of the thickness of the second inorganic layer to the thickness of the first inorganic layer is different from a ratio of the thickness of the fourth inorganic layer to the thickness of the third inorganic layer.

By virtue of this advantageous configuration, the first inorganic layer has the column-like structure with the orientation angle different from the orientation angle of the column-like structure of the second inorganic layer, and therefore the ratio of the thickness of the second inorganic layer to the thickness of the first inorganic layer is adjusted with the result that an influence of the first alignment layer on impurity ions in the liquid crystal layer can be adjusted. Similarly, the ratio of the thickness of the fourth inorganic layer to the thickness of the third inorganic layer is adjusted with the result that an influence of the second alignment layer on the impurity ions in the liquid crystal layer can be adjusted.

The ratio of the thickness of the second inorganic layer to the thickness of the first inorganic layer is different from the ratio of the thickness of the fourth inorganic layer to the thickness of the third inorganic layer, and therefore an influence of the first alignment layer on the impurity ions in the liquid crystal layer becomes different from an influence of the second alignment layer on the impurity ions in the liquid crystal layer. Accordingly, the influence of the first alignment layer on the impurity ions can be configured so as to be different from the influence of the second alignment layer on the impurity ions such that a difference between an influence of the first substrate on the impurity ions regardless of the first alignment layer and an influence of the second substrate on the impurity ions regardless of the second alignment layer can be reduced. Consequently, nonuniformity of the impurity ions between the first substrate and the second substrate can be precluded, so that a deviation of a common potential from the optimum value due to the nonuniformity of the impurity ions can be decreased.

Furthermore, the second and fourth inorganic layers are provided so as to contact the liquid crystal layer, and therefore influences of the first and second alignment layers on the impurity ions can be determined in comprehensive view of influences of configuration members of the liquid crystal device on the impurity ions, the configuration members being disposed on the sides opposite to the liquid crystal layer with respect to the second and fourth inorganic layers. Accordingly, a deviation of a common potential from the optimum value due to the nonuniformity of the impurity ions can be significantly decreased.

Furthermore, the alignment layer itself is provided also in a typical liquid crystal device, and therefore need for adding a new member to reduce the nonuniformity of the impurity ions is decreased, thereby being able to preclude disadvantages such as: change of characteristics of the liquid crystal device due to adding the new member; complicated device configuration; and decreased manufacturing efficiency.

The liquid crystal device according to the first aspect of the invention may employ the following configurations.

It is preferable that magnitude ratio of the thickness of the second inorganic layer to the thickness of the first inorganic layer is inverted with respect to the magnitude ratio of the thickness of the fourth inorganic layer to the thickness of the third inorganic layer.

Description will be made with respect to the case in which an influence of the first substrate on the impurity ions regardless of the first alignment layer is larger than that of the second substrate on the impurity ions regardless of the second alignment layer. A ratio between the thicknesses of the inorganic layers in the first alignment layer is determined such that an influence of the first substrate on the impurity ions regardless of the first alignment layer is decreased, and then the second alignment layer functions to increase an influence of the second substrate on the impurity ions regardless of the second alignment layer. Accordingly, the first and second alignment layers respectively function so as to reduce a difference between the influence of the side of the first substrate on the impurity ions and the influence of the side of second substrates on the impurity ions with the result that the influence on the impurity ions easily become uniform between the sides of the first and second substrates.

In the case where the influence of the first substrate on the impurity ions regardless of the first alignment layer is smaller than that of the second substrate on the impurity ions regardless of the second alignment layer, the proportion between the thicknesses of the inorganic layers in the first alignment layer is determined such that the influence of the first substrate on the impurity ions regardless of the first alignment layer is increased, and then the influence on the impurity ions easily become uniform between the sides of the first and second substrates for the reason the same as above.

It is preferable that the adsorbability of impurity ions contained in the liquid crystal layer to the side of the first substrate is different from the adsorbability of the impurity ions to the side of the second substrate and that the thickness ratios of the inorganic layer are set such that the difference in the adsorbability is decreased.

By virtue of this advantageous configuration, the impurity ions are uniformly adsorbed to the sides of the first and second substrates, and therefore an electric field is prevented from being generated between the first and second substrates resulting from a difference in adsorbed amounts, so that the generation of the electric field is prevented from applying direct current (DC) components to the liquid crystal layer. Accordingly, deterioration of the liquid crystal layer due to the DC components is prevented, and the DC components are prevented from increasing the difference between adsorbability of the impurity ions to the first substrate and adsorbability of the impurity ions to the second substrate.

It is preferable that the liquid crystal device includes a reflecting electrode disposed between the first substrate and the first alignment layer, that the liquid crystal device includes a transparent electrode disposed between the second substrate and the second alignment layer, and that the ratio is determined such that a difference in the adsorbability is decreased, such difference resulting from a difference between a work function of the reflecting electrode and a work function of the transparent electrode.

By virtue of this advantageous configuration, the ratio between the thicknesses of the inorganic layers in each of the first and second alignment layers is adjusted, so that the difference in the adsorbability of the impurity ions is capable of being decreased, such difference resulting from the difference between the work function of the reflecting electrode and the work function of the transparent electrode. Accordingly, without a complicated device configuration and a decreased manufacturing efficiency, a reflective liquid crystal device that is capable of decreasing a deviation of a common potential from the optimum value is capable of being provided.

It is preferable that passivation layers are individually provided between the reflecting electrode and the first alignment layer and between the transparent electrode and the second alignment layer.

By virtue of this advantageous configuration, the reflecting electrode can be protected by the passivation layers. Furthermore, the adsorbability of the impurity ions can be less affected by a difference in materials between the reflecting electrode and the transparent electrode, so that a difference between adsorbability of the impurity ions to the first substrate and adsorbability of the impurity ions to the second substrate can be decreased.

According to a second aspect of the invention, there is provided a liquid crystal device having a liquid crystal layer disposed between a first substrate and a second substrate, the liquid crystal device including: a first alignment layer that is formed on the first substrate at the side of the liquid crystal layer, the first alignment layer including two or more inorganic layers each having a column-like structure; and a second alignment layer that is formed on the second substrate at the side of the liquid crystal layer, the second alignment layer including two or more inorganic layers each having a column-like structure. The two or more inorganic layers of the first alignment layer include a first inorganic layer and a second inorganic layer, the second inorganic layer being disposed on the first inorganic layer at the side of the liquid crystal layer so as to contact the liquid crystal layer, the second inorganic layer having the column-like structure with an orientation angle different from an orientation angle of the column-like structure of the first inorganic layer. The two or more inorganic layers of the second alignment layer include a third inorganic layer and a fourth inorganic layer, the fourth inorganic layer being disposed on the third inorganic layer at the side of the liquid crystal layer so as to contact the liquid crystal layer, the fourth inorganic layer having the column-like structure with an orientation angle different from an orientation angle of the column-like structure of the third inorganic layer. A ratio of the thickness of the second inorganic layer to the thickness of the first inorganic layer is the same as a ratio of the thickness of the fourth inorganic layer to the thickness of the third inorganic layer. The total thickness of the first inorganic layer and the second inorganic layer is different from the total thickness of the third inorganic layer and the fourth inorganic layer.

By virtue of this advantageous configuration, the ratio between the thicknesses of the inorganic layers in the first alignment layer is the same as the ratio between the thicknesses of the inorganic layers in the second alignment layer, and the total thickness of the first and second inorganic layers is different from the total thickness of the third and fourth inorganic layers. Therefore, an influence of the first alignment layer on the impurity ions contained in the liquid crystal layer becomes different from an influence of the second alignment layer on the impurity ions contained in the liquid crystal layer. Accordingly, for the same reason as in the case of the liquid crystal device according to the first aspect of the invention, a deviation of a common potential from the optimum value can be significantly decreased without change of characteristic of the liquid crystal device, such change resulting from addition of the new component, a complicated device configuration, and decreased manufacturing efficiency.

According to a third aspect of the invention, there is provided a method of manufacturing a liquid crystal device having a liquid crystal layer disposed between a first substrate and a second substrate, the method including: a first process of forming a first alignment layer on the first substrate; and a second process of forming a second alignment layer on the second substrate. In the first process, a first inorganic material is deposited on the first substrate by a vapor deposition method or a sputtering method to form a first inorganic layer, and then the first inorganic material is deposited by a vapor deposition method or a sputtering method at a deposition angle different from that in the formation of the first inorganic layer with the result that a second inorganic layer is formed, thereby forming the first alignment layer including the first and second inorganic layers. In the second process, a second inorganic material is deposited on the second substrate by a vapor deposition method or a sputtering method to form a third inorganic layer, and then the second inorganic material is deposited by a vapor deposition method or a sputtering method at a deposition angle different from that in the formation of the third inorganic layer with the result that a fourth inorganic layer is formed, thereby forming the second alignment layer including the third and fourth inorganic layers. In the first and second processes, a ratio of the thickness of the second inorganic layer to the thickness of the first inorganic layer is configured so as to be different from a ratio of the thickness of the fourth inorganic layer to the thickness of the third inorganic layer.

By virtue of this advantageous configuration, the first and second inorganic layers are formed as a result of depositing the identical inorganic materials while different deposition angles are individually employed in the first process, and therefore the first alignment layer is capable of being formed as a result of deposition conditions being adjusted. Accordingly, the first alignment layer can be efficiently formed. For the same reason, the second alignment layer is also capable of being efficiently formed, so that a liquid crystal device which is capable of decreasing a deviation of a common potential from the optimum value can be efficiently manufactured.

It is preferable that the first inorganic material is deposited in a direction normal to the first substrate to form the first inorganic layer in the first process and that the second inorganic material is deposited in a direction normal to the second substrate to form the third inorganic layer in the second process.

By virtue of this advantageous configuration, the first inorganic material is deposited in a direction normal to the first substrate, and therefore the first inorganic layer can be formed so as to have a precise quality. The second inorganic layer is formed on the first inorganic layer having the precise quality by using the inorganic material the same as that of the first inorganic layer, and therefore the second inorganic layer can be formed so as to have excellent quality. Accordingly, the first alignment layer can be formed so as to have high reliability. For the same reason, the second alignment layer can be formed so as to have high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Embodiments of the invention will be hereinafter described with reference to the accompanying drawings. In the drawings used for the description, some structures are illustrated so as to have sizes and scales different from those of the actual structures for the purpose of simply illustrating novel components. Furthermore, in the embodiments, the same components are denoted by the same symbols, and detailed description thereof may be omitted where appropriate.

First Embodiment

Figure 1A:
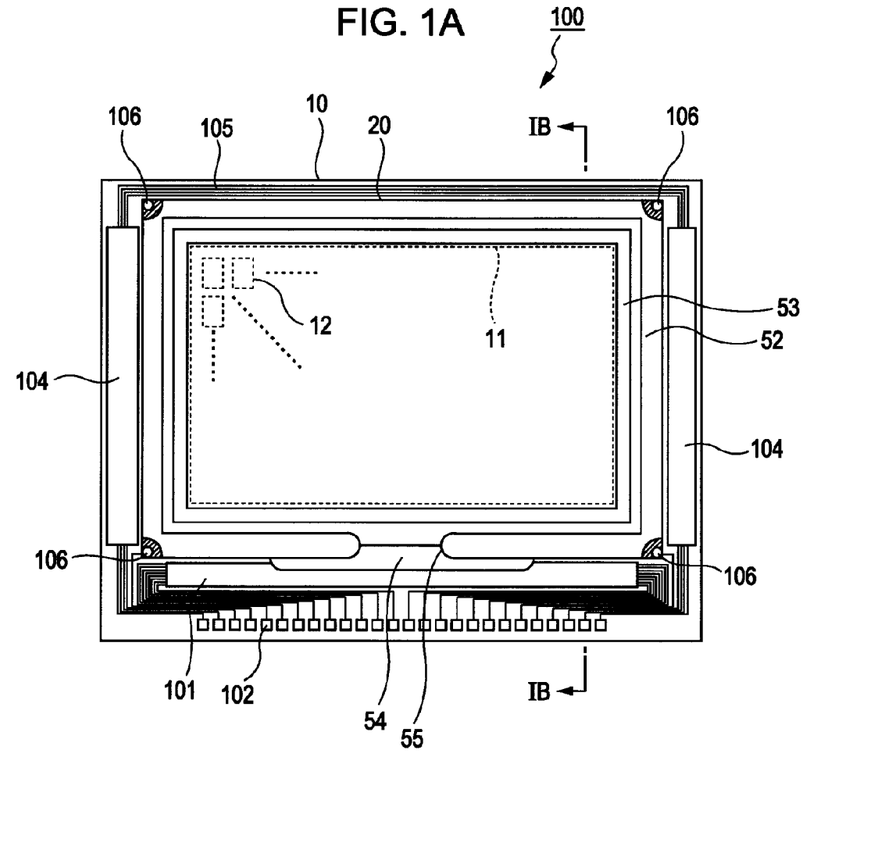
FIG. 1A is a planar view illustrating a liquid crystal device.
Figure 1B:
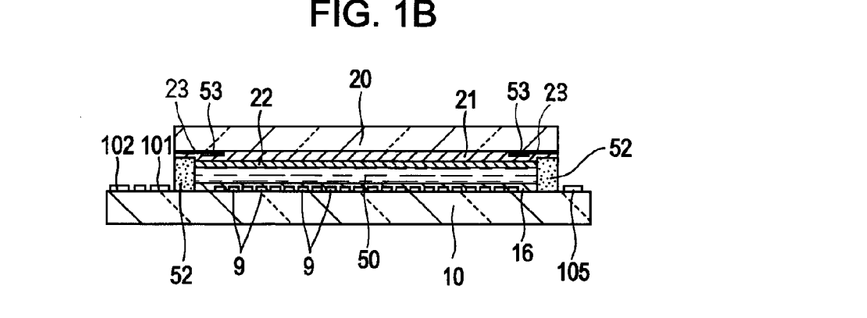
FIG. 1B is a cross-sectional view illustrating the liquid crystal device.

FIGS. 1A and 1B each illustrate the configuration of a liquid crystal device 100 of a first embodiment. FIG. 1A is a planar view illustrating the configuration of the liquid crystal device 100. FIG. 1B is a cross-sectional view illustrating the configuration of the liquid crystal device 100 taken along a line IB-IB in FIG. 1A.

With reference to FIGS. 1A and 1B, the liquid crystal device 100 has a first substrate (hereinafter referred to as a device substrate) 10 and a second substrate (hereinafter referred to as a counter substrate) 20, and the device substrate 10 and the counter substrate 20 are attached to each other through a sealing member 52 having a substantially rectangular shape with a frame-like structure in planar view. A liquid crystal layer 50 is confined in a region surrounded by the sealing member 52. A frame 53 having a rectangular shape in planar view is provided along the inner periphery of the sealing member 52, and a region inside the frame 53 serves as a display region 11.

A plurality of pixels 12 are provided inside the display region 11 in a matrix arrangement. Each of the pixels 12 functions as the minimum display unit in the display region 11. In a region outside the sealing member 52, a data line-driving circuit 101 and external circuit-mounting terminals 102 are formed along one side (lower side in the drawing) of the device substrate 10, and scanning line-driving circuits 104 are individually formed along two sides extending from the above one side, thereby forming a peripheral circuit.

A plurality of wires 105 are provided on the other side (upper side in the drawing) of the device substrate 10 to connect the scanning line-driving circuits 104 to each other, the scanning line-driving circuits 104 being positioned at two sides of the display region 11. Inter-substrate conduction members 106 are provided at the corners of the counter substrate 20 to provide electrical continuity between the device substrate 10 and the counter substrate 20.

With reference to FIG. 1B, a plurality of pixel electrodes 9 are formed so as to be arranged on the device substrate 10 at the side of the liquid crystal layer 50. The pixel electrodes 9 are provided so as to individually correspond to the pixels 12. The device substrate 10 has a plurality of switching units (not illustrated). For example, thin film transistors are employed for the switching units, and the switching units are provided so as to individually correspond to the pixels 12. Source regions of the switching units are electrically connected to the data line-driving circuit 101 through data lines (not illustrated). Gate electrodes of the switching units are electrically connected to the scanning line-driving circuits 104 through data lines (not illustrated). Drain regions of the switching units are electrically connected to the pixel electrodes 9.

A first alignment layer 16 is formed so as to cover the pixel electrodes 9. The frame 53 and a light-shielding film 23 are formed at the liquid crystal layer 50 side of the counter substrate 20. A plate-like common electrode 21 is formed so as to overlie the frame 53 and light-shielding film 23. A second alignment layer 22 is formed so as to cover the lower portion of the common electrode 21. In a state in which an electric field is not applied to the liquid crystal layer 50, an alignment state of the liquid crystal layer 50 is regulated by the first alignment layer 16 and the second alignment layer 22.

The liquid crystal device 100 of the embodiment is configured as a transmissive liquid crystal device. Each of the pixel electrodes 9 and the common electrode 21 is made of a transparent conductive material such as indium tin oxide (hereinafter referred to as ITO). Image signals of images to be displayed are supplied from the exterior of the liquid crystal device 100 through the external circuit-mounting terminals 102. On the basis of image data included in the image signals and indicating a gray scale value for each pixel 12, the data line-driving circuit 101 outputs a drive voltage waveform to each of the switching units, the drive voltage waveform serving to drive the liquid crystal layer 50. On the basis of data included in the image signals and indicating display timing of each pixel 12, the scanning line-driving circuits 104 apply voltages to the gate electrodes of the switching units to control on and off states of the switching units. In the case where each of the switching units turns on, a drive voltage waveform is supplied to each of the pixel electrodes 9, and then a voltage is applied to each of the pixel electrodes 9. For example, an electric potential of the common electrode 21 is held at the common potential of each of the pixel electrodes 9. A voltage corresponding to a potential difference between each of the pixel electrodes 9 and the common electrode 21 is applied to the liquid crystal layer 50. This voltage generates an electric field with the result that the alignment states of the liquid crystal layer 50 are changed. The polarization state of light that has entered the liquid crystal layer 50 is changed in each of the pixels 12 on the basis of the alignment states of the liquid crystal layer 50. Light that has been emitted from the liquid crystal layer 50 passes through a polarization plate (not illustrated), and then light having a gray scale value corresponding to image data is emitted from the polarization plate. In this manner, an image corresponding to image data is capable of being displayed.

Figure 2A:
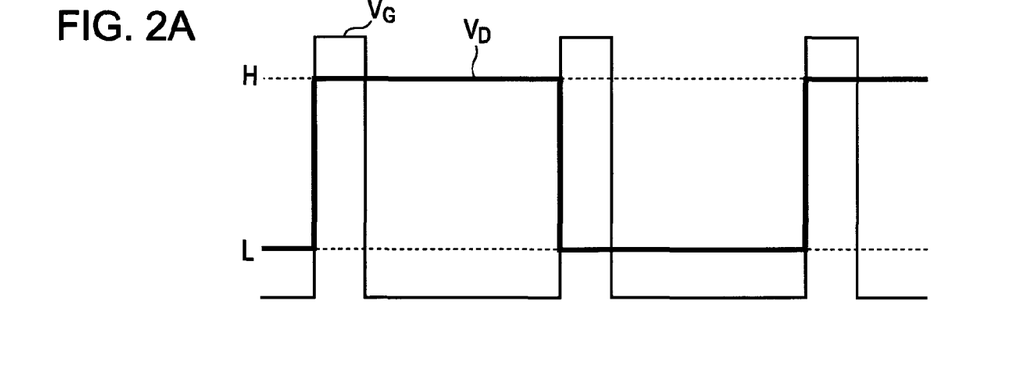
FIG. 2A is a chart illustrating a gate voltage waveform and a drive voltage waveform.
Figure 2B:
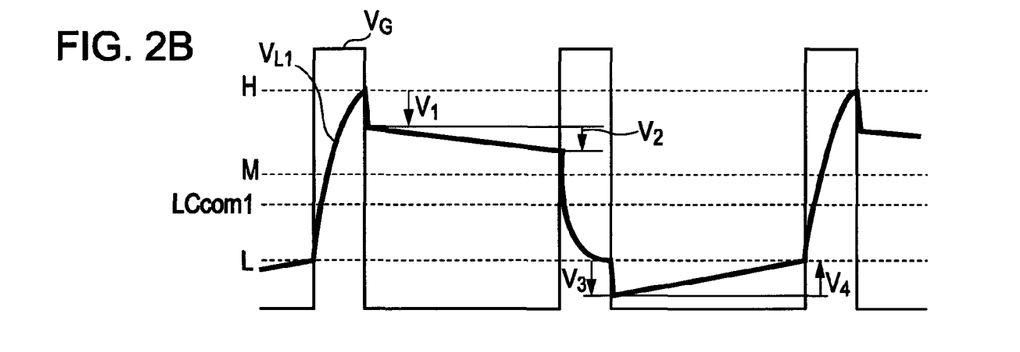
FIG. 2B is a chart illustrating the gate voltage waveform and an effective voltage waveform in a liquid crystal layer.
Figure 2C:
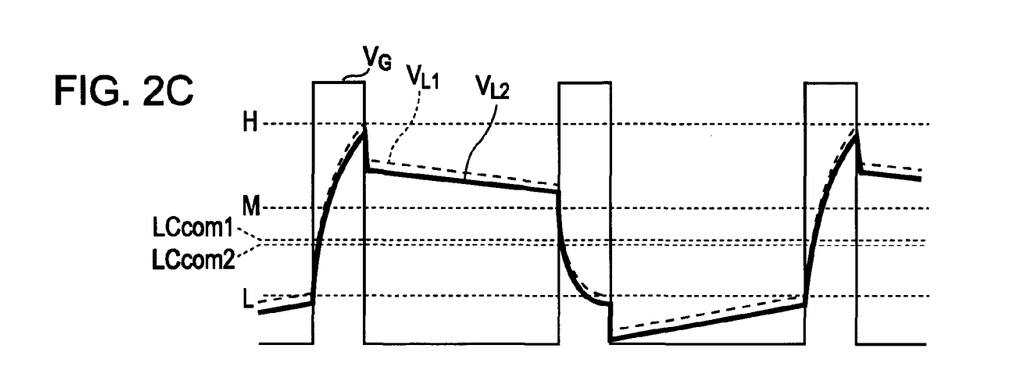
FIG. 2C is a chart illustrating the gate voltage waveform and an effective voltage waveform in the liquid crystal layer after drive time has passed.

FIG. 2A is a chart illustrating a gate voltage waveform and a drive voltage waveform. FIG. 2B is a chart illustrating the gate voltage waveform and an effective voltage waveform in a liquid crystal layer 50. FIG. 2C is a chart illustrating the gate voltage waveform and an effective voltage waveform in the liquid crystal layer 50 after drive time has passed from a state in FIG. 2B and also schematically illustrating the balance between the rise and fall of the effective voltage. In each of FIGS. 2A to 2C, a lateral axis indicates the passage of time, and a vertical axis indicates an electric potential.

With reference to FIG. 2A, the electric potential of a drive voltage waveform $V_D$ is alternately changed between a high potential level H (for example, 12 V) and a low potential level L (for example, 2 V) in synchronization with the rise of a gate voltage $V_G$.

In the case where the gate voltage $V_G$ rises as illustrated in FIG. 2B, the switching units turn on, and then the pixel electrodes 9 are charged. The electric potential of an effective voltage waveform $V_{L1}$ in the liquid crystal layer 50 generally rises from the low potential level L to the high potential level H. In the case where a thin film transistor is employed for each of the switching units, each of the switching units enters an off-state with the result that a punch-through voltage may be caused.

Namely, charges that are accumulated in capacitance generated between the gate electrode and the channel region of each of the switching units flow to the pixel electrodes 9, thereby causing voltage depression $V_1$ (punch-through voltage). Furthermore, in the case where each of the switching units is in an off-state, leak current flows in the channel region with the result that voltage depression $V_2$ may be caused. When the gate voltage $V_G$ subsequently rises, the electric potential of the effective voltage waveform $V_{L1}$ is reduced relative to the high potential level H in an amount corresponding to the voltage depression $V_1$ and $V_2$.

In the case of such a subsequent rise of the gate voltage $V_G$, the drive voltage waveform $V_D$ is decreased to the low potential level L with the result that the pixel electrodes 9 discharge electricity. In this case, the electric potential of the effective voltage waveform $V_{L1}$ of the liquid crystal layer 50 is reduced to the low potential level L. In the case where each of the switching units enters an off-state, voltage depression $V_3$ is caused resulting from a punch-through voltage, and a voltage rise $V_4$ is caused resulting from leak current.

The electric potential of the common electrode 21 is held at the level of a common potential LCcom1. The common potential LCcom1 is preliminarily determined such that the effective voltage waveform $V_{L1}$ is balanced between a high potential level side and a low potential level side with respect to the common potential LCcom1. The common potential LCcom1 is determined in view of the voltage depression $V_1$ to $V_3$ and in view of the voltage rise $V_4$ and is generally configured as a value different from a middle potential level M (for example, 7 V) that is provided between the high potential level H and the low potential level L. For example, the common potential LCcom1 is configured as follows: obtaining the absolute value of the temporal integration value of a difference between the effective voltage waveform VL1 and the common potential LCcom1 in a period of the high potential level H of the drive voltage waveform $V_D$; obtaining the absolute value of the temporal integration value of a difference between the effective voltage waveform VL1 and the common potential LCcom1 in a period of the low potential level L of the drive voltage waveform $V_D$; and defining a value that is optimized such that the resultant differences are equal to each other.

The effective voltage waveform $VL_1$ exhibited immediately after the liquid crystal layer 50 has been started to be driven often shifts to an effective voltage waveform $VL_2$ exhibited after the liquid crystal layer 50 has been driven for a certain period as illustrated in FIG. 2C. Although the effective voltage waveform $VL_2$ may shift in either of a rise or fall direction of an electric potential, FIG. 2C illustrates a case in which the effective voltage waveform $VL_2$ shifts in the fall direction. A common potential LCcom2 which is optimized so as to be balanced between the rise and fall of the shifted effective voltage waveform $VL_2$ is assumed. The common potential LCcom2 after the shift deviates from the common potential LCcom1 before the shift.

In the case where the difference (hereinafter referred to as an LCcom difference) between the common potentials LCcom1 and LCcom2 is increased and exceeds a certain level, there is a large difference in modulation between the period of the low potential level and the period of the high potential level in the liquid crystal layer 50. Then, in a displayed image, a difference between an amount of light modulated in the period of the high potential level and an amount of light modulated in the period of the low potential level is visibly recognized, thereby causing a flickering of the image. Furthermore, a direct-current (DC) component is applied to the liquid crystal layer 50 in response to the LCcom difference, thereby easily degrading the quality of the liquid crystal layer 50. Furthermore, the DC component causes nonuniformity of impurities (especially, impurity ions) contained in the liquid crystal layer 50 between the side of the device substrate 10 and the side of the counter substrate 20. The nonuniformity of the impurity ions generates an electric field, thereby further increasing the LCcom difference. In particular, in the case where the impurity ions are nonuniformly adsorbed to the first alignment layer 16 on the device substrate 10 or to the second alignment layer 22 on the counter substrate 20, the electric field generated by the adsorbed impurity ions partially sets the modulation in the liquid crystal layer 50, thereby causing image burning.

A structural difference between the device substrate 10 and the counter substrate 20 causes an imbalance between the adsorbability of the impurity ions to the side of the device substrate 10 and the adsorbability of the impurity ions to the side of the counter substrate 20, thereby likely contributing to the generation of the LCcom difference. The adsorbability of the impurity ions acts as a force with which ions are attracted and acts as a force with which ions are adsorbed. The adsorbability of the impurity ions is assumed to be changed in response to characteristics, such as a dielectric constant, permeability, or capacitance, of various components included in the device substrate 10 or the counter substrate 20. In the first alignment layer 16 and the second alignment layer 22, a difference in bases thereof causes a variation of flatness, and surface areas are different from each other, and these differences are assumed to have effects on the adsorbability of the impurity ions.

Embodiments of the invention each have a configuration in which an influence of the first alignment layer 16 on the impurity ions is not balanced with an influence of the second alignment layer 22 on the impurity ions with the result that the difference between ion adsorbability to the side of the device substrate 10 and ion adsorbability to the side of the counter substrate 20 is decreased. With reference to numerical examples, the configurations of the first alignment layer 16 and second alignment layer 22 and an advantageous effect in which the LCcom difference is decreased will be hereinafter described.

Figure 3A:
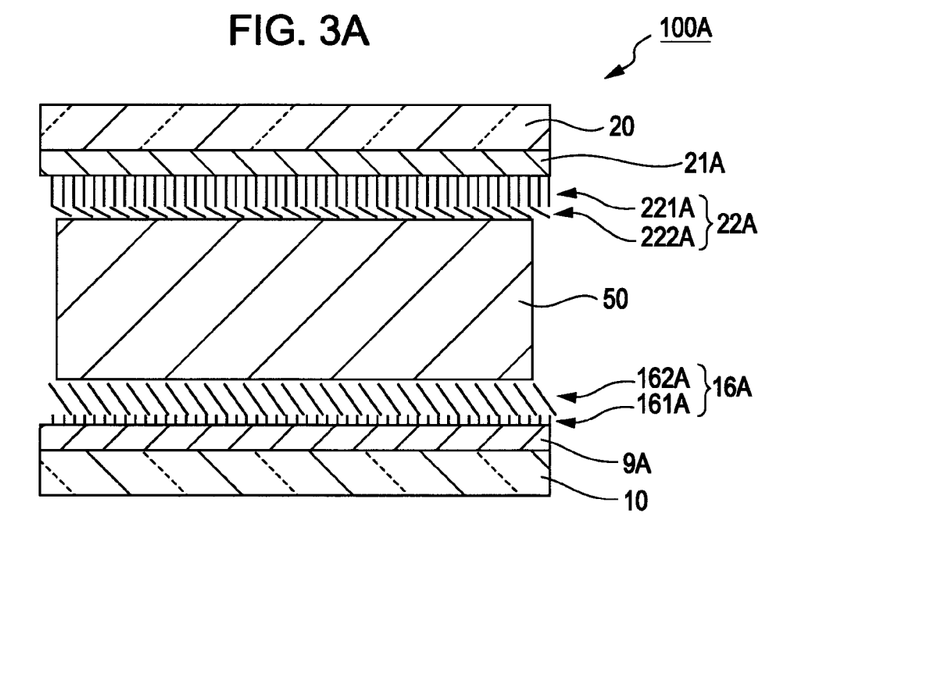
FIG. 3A illustrates first and second alignment layers of a first example in an enlarged manner.
Figure 3B:
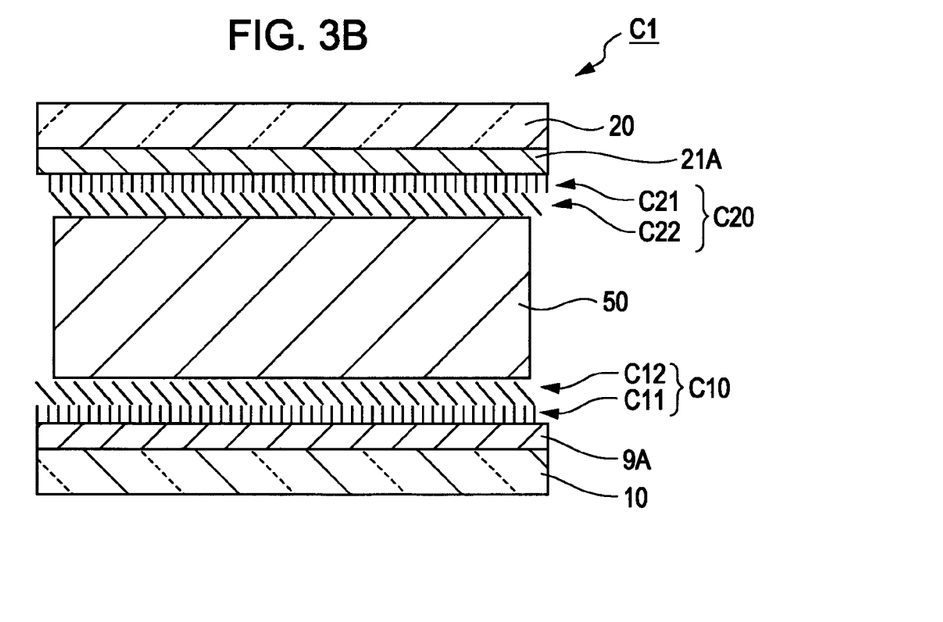
FIG. 3B illustrates first and second alignment layers of a first comparison example in an enlarged manner.

FIG. 3A is a cross-sectional view schematically illustrating first and second alignment layers in a first example according to an embodiment of the invention in an enlarged manner. FIG. 3B is a cross-sectional view schematically illustrating first and second alignment layers in a first comparison example in an enlarged manner. In FIGS. 3A and 3B, illustration of the components of the device substrate 10 and counter substrate 20 is omitted.

With reference to FIG. 3A, a liquid crystal device 100A of the first example has the device substrate 10, a pixel electrode 9A, a first alignment layer 16A, the counter substrate 20, a common electrode 21A, a second alignment layer 22A, and the liquid crystal layer 50. Each of the pixel electrode 9A and the common electrode 21A is made of ITO. The first alignment layer 16A includes a first inorganic layer 161A and a second inorganic layer 162A. The second alignment layer 22A includes a third inorganic layer 221A and a fourth inorganic layer 222A. Each of the first to fourth inorganic layers is formed as a result of silicon oxide being deposited by a vapor deposition method or a sputtering method and has a column-like structure.

The first inorganic layer 161A is provided as the under layer of the first alignment layer 16A and is formed on the pixel electrode 9A. In the first inorganic layer 161A, an angle (orientation angle) between an axial direction of the column-like structure and a direction normal to the pixel electrode 9A is approximately 0°. The first inorganic layer 161A has a thickness of approximately 20 nm.

The second inorganic layer 162A is provided as the upper layer of the first alignment layer 16A and is formed on the first inorganic layer 161A so as to contact the liquid crystal layer 50. The second inorganic layer 162A has the column-like structure with an orientation angle of approximately 15° and has a thickness of approximately 60 nm.

As described above, the first alignment layer 16A has the total thickness of approximately 80 nm. A ratio of the thickness of the second inorganic layer 162A to the thickness of the first inorganic layer 161A is configured as approximately three. The column-like structure of the first inorganic layer 161A has the orientation angle different from that of the column-like structure of the second inorganic layer 162A. In the first alignment layer 16A, the second inorganic layer 162A disposed at the side of the liquid crystal layer 50 has a thickness larger than the thickness of the first inorganic layer 161A.

The third inorganic layer 221A is provided as the under layer of the second alignment layer 22A and is formed on the common electrode 21A. In the third inorganic layer 221A, an angle (orientation angle) between an axial direction of the column-like structure and a direction normal to the common electrode 21A is approximately 0°. The third inorganic layer 221A has a thickness of approximately 60 nm.

The fourth inorganic layer 222A is provided as the upper layer of the second alignment layer 22A and is formed on the third inorganic layer 221A so as to contact the liquid crystal layer 50. The fourth inorganic layer 222A has the column-like structure with an orientation angle of approximately 15° and has a thickness of approximately 20 nm.

As described above, the second alignment layer 22A has the total thickness of approximately 80 nm. A ratio of the thickness of the fourth inorganic layer 222A to the thickness of the third inorganic layer 221A is configured as approximately one third. The column-like structure of the third inorganic layer 221A has the orientation angle different from that of the column-like structure of the fourth inorganic layer 222A. In the second alignment layer 22A, the fourth inorganic layer 222A disposed at the side of the liquid crystal layer 50 has a thickness smaller than the thickness of the third inorganic layer 221A.

The ratio between the thicknesses of the upper and lower inorganic layers in the second alignment layer 22A (one third, herein) is different from the ratio between the thicknesses of the upper and lower inorganic layers in the first alignment layer 16A (three, herein). Focusing attention on magnitude ratio between the thicknesses of the upper and lower inorganic layers in each of the first alignment layer 16A and the second alignment layer 22A, the upper inorganic layer has a larger thickness in the first alignment layer 16A, and the lower inorganic layer has a larger thickness in the second alignment layer 22A. The magnitude ratio between the thicknesses of the upper and lower inorganic layers in the first alignment layer 16A is inverted with respect to that in the second alignment layer 22A.

In the case where the thickness of the lower layer is changed in each of the first and second alignment layers 16A and 22A, properties are changed, such as: capacitance of the lower layer itself; flatness on a surface of the lower layer, the surface being positioned on the side of the liquid crystal layer 50 (the surface that functions as the base of the upper layer); quality of the upper layer (precision, for example); and a dielectric constant or permeability between the base side of the lower layer and the liquid crystal layer 50. In the case where the thickness of the upper layer is changed, the length of the column-like structure having a fine profile with respect to the liquid crystal layer 50 is changed, thereby changing a substantial contact area between the upper layer and the liquid crystal layer 50 and changing properties such as a dielectric constant and permeability between the base side of the upper layer and the liquid crystal layer 50.

With such property variations, adsorbability of the impurity ions in the liquid crystal layer 50 to the side of the device substrate 10 is changed in response to the ratio between the thicknesses of the upper and lower layers in the first alignment layer 16A, the adsorbability being namely a force with which the impurity ions contained in the liquid crystal layer 50 are attracted to the side of the device substrate 10 or being an amount in which the impurity ions are adsorbed to the first alignment layer 16A per unit time. Similarly, adsorbability of the impurity ions in the liquid crystal layer 50 to the side of the counter substrate 20 is changed in response to the ratio between the thicknesses of the upper and lower layers in the second alignment layer 22A.

The ratio between thicknesses of the upper and lower layers in the first alignment layer 16A is different from the ratio between thicknesses of the upper and lower layers in the second alignment layer 22A. Therefore, in each of the sides of the device substrate 10 and the counter substrate 20, the ratio can be adjusted so as to decrease a difference in the adsorbability of the impurity ions contained in the liquid crystal layer 50.

In particular, the magnitude ratio between the thicknesses of the upper and lower layers in the first alignment layer 16A is inverted with respect to the magnitude ratio between the thicknesses of the upper and lower layers in the second alignment layer 22A. Therefore, the adsorbability of the impurity ions is adjusted so as to be increased at either of the device substrate 10 side or the counter substrate 20 side, and the adsorbability of the impurity ions is adjusted so as to be decreased at the other side. Accordingly, even in the case where the adsorbability of the impurity ions is significantly different from each other between the side of the device substrate 10 and the side of the counter substrate 20, the adsorbability of the impurity ions is capable of being made to be uniform between the side of the device substrate 10 and the side of the counter substrate 20.

With reference to FIG. 3B, the liquid crystal device C1 of the first comparison example has the configuration the same as that in the first example except a first alignment layer C10 and a second alignment layer C20. The first alignment layer C10 includes a first inorganic layer C11 and a second inorganic layer C12. The second alignment layer C20 includes a third inorganic layer C21 and a fourth inorganic layer C22.

In the first comparison example, the thickness ratios of the inorganic layers are different from those in the first example. The configuration of the first comparison example is the same as that of the first example except the thickness ratios of the inorganic layers. In the first comparison example, each of the first to fourth inorganic layers has a thickness of approximately 40 nm. In the first comparison example, a ratio of the thickness of the second inorganic layer C12 to the thickness of the first inorganic layer C11 is configured as approximately one, and a ratio of the thickness of the fourth inorganic layer C22 to the thickness of the third inorganic layer C21 is configured as approximately one. Namely, in the first comparison example, the ratio between the thicknesses of the inorganic layers in the first alignment layer C10 is the same as the ratio between the thicknesses of the inorganic layers in the second alignment layer C20.

In the liquid crystal devices of the first example and first comparison example having the above configurations, LCcom differences were compared with each other under the following conditions. Drive voltage waveforms were configured as square waves of 60 Hz, and the liquid crystal devices of the first example and first comparison example were individually AC-driven with the same drive voltage waveforms. In this case, a common potential was optimized such that the rise and fall of an effective voltage waveform in the liquid crystal layer 50 was balanced with the common potential. The optimized common potential was held, and the liquid crystal device of each of the first example and the first comparison example was driven at a temperature of 80° C. for 60 minutes. Subsequently, in the liquid crystal device of each of the first example and the first comparison example, the common potential was again optimized such that the rise and fall of the effective voltage waveform in the liquid crystal layer 50 was balanced with the common potential. A difference between the subsequently optimized common potential and the initially optimized common potential was obtained as the LCcom difference. As a result, the liquid crystal device of the first comparison example had an LCcom difference of 0.3 V, whereas the liquid crystal device of the first example had an LCcom difference of 0.05 V. Accordingly, in the first example according to an embodiment of the invention, it was confirmed that the LCcom difference was significantly reduced relative to the first comparison example having a typical configuration.

The inventors researched an acceptable range of the LCcom difference and found that a flicker or image burning was almost never caused in the case where the absolute value of the LCcom difference was less than or equal to 0.2 V. Actually, in the case where an identical display pattern was continuously displayed on the liquid crystal device of the first example for 10 hours, it was confirmed that image burning or a flicker was not visibly recognized. Furthermore, a liquid crystal device of a second example having the following configuration was manufactured, and an LCcom difference was researched.

Although the detailed configuration of the liquid crystal device of the second example is not illustrated, the liquid crystal device of the second example has the configuration the same as that of the liquid crystal device of each of the first example and first comparison example except the thicknesses of first to fourth inorganic layers. In the first alignment layer of the second example, the first inorganic layer is provided as the lower layer and has a thickness of approximately 20 nm, and the second inorganic layer is provided as the upper layer and has a thickness of approximately 80 nm. In the second alignment layer, the third inorganic layer is provided as the lower layer and has a thickness of approximately 80 nm, and the fourth inorganic layer is provided as the upper layer and has a thickness of approximately 20 nm. The ratio between the thicknesses of the inorganic layers in the first alignment layer (four, herein) is different from the ratio between the thicknesses of the inorganic layers in the second alignment layer (quarter, herein). Focusing attention on magnitude ratio between the thicknesses of the upper and lower layers in each of the first and second alignment layers, the magnitude ratio between the thicknesses of the upper and lower layers in the first alignment layer was configured so as to be inverted with respect to the magnitude ratio between the thicknesses of the upper and lower layers in the second alignment layer.

The liquid crystal device of the second example was driven under the conditions the same as those of the first example and first comparison example to research the LCcom difference, and then the liquid crystal device of the second example had an LCcom difference of −0.05 V. In the case where an identical display pattern was continuously displayed on the liquid crystal device of the second example for 10 hours, it was confirmed that image burning or a flicker was not visibly recognized.

As being obvious in the first and second examples, in the case where a ratio of the thickness of the second inorganic layer to the thickness of the first inorganic layer is increased, the LCcom difference shifts to the side of a negative potential. Accordingly, the LCcom difference is capable of being minimized in the following manner, for example. First, for example, a test liquid crystal device similar to the liquid crystal device of the first comparison example is configured such that the ratio between the thicknesses of inorganic layers in each of the first and second alignment layers is configured as a temporary value. Then, the LCcom difference of the test liquid crystal device is obtained. In the case where the LCcom difference is in a positive potential, a ratio of the thickness of the second inorganic layer to the thickness of the first inorganic layer is increased, thereby being able to bring the absolute value of the LCcom difference close to zero. In the case where the LCcom difference is in a negative potential, a ratio of the thickness of the second inorganic layer to the thickness of the first inorganic layer is decreased, thereby being able to bring the absolute value of the LCcom difference close to zero.

As described above, in the liquid crystal device of the first embodiment (liquid crystal device 100A of the first example, for example), a ratio of the thickness of the second inorganic layer 162A to the thickness of the first inorganic layer 161A is different from a ratio of the thickness of the fourth inorganic layer 222A to the thickness of the third inorganic layer 221A. Therefore, the absolute value of a deviation (LCcom difference) of a common potential from the optimum value can be decreased. Accordingly, generation of a flicker or image burning is almost precluded, thereby being able to display a high-quality image. In the case where a liquid crystal device to which an embodiment of the invention is applied is used for an electronic apparatus such as a direct view-type display panel, a projector, or a viewfinder of a camera or the like, an electronic apparatus which enables a high-quality image to be displayed is capable of being provided.

The first and second alignment layers are provided so as to contact the liquid crystal layer 50, and therefore adsorbability of the impurity ions can be directly controlled. Accordingly, relationship of the LCcom difference to a ratio between the thicknesses of the inorganic layers included in each of the first and second alignment layers is simplified (exhibiting a line shape, for example), and the optimum thickness ratios of the inorganic layers for decreasing the LCcom difference are easily obtained. Furthermore, the thickness ratios of the inorganic layers can be determined in view of an influence of configuration members, which are disposed at the side opposite to the liquid crystal layer 50 with respect to the first and second alignment layers, on adsorbability of impurity ions, and simply in comprehensive view of all of the configuration members. In terms of decreasing the LCcom difference, as compared with a technique in which properties are adjusted for each configuration members, the materials of the configuration members can be more flexibly selected, and the configurations thereof can be more easily designed.

The alignment layer itself is provided also in a typical liquid crystal device, and therefore adjustment of the proportion between the thicknesses of the inorganic layers included in each of the first and second alignment layers is almost free from an adverse effect (tradeoff). Furthermore, need for adding a new component and need for creating a driving scheme are decreased in terms of decreasing the LCcom difference. Accordingly, the electric properties and display properties of the liquid crystal device are capable of being prevented from being changed, and a complicated device configuration is capable of being precluded, and manufacturing efficiency is capable of being prevented from being decreased.

Next, an embodiment of a method of manufacturing the liquid crystal device according to an embodiment of the invention will be described on the basis of the configuration of the liquid crystal device of the first example.

FIGS. 4A to 4D are cross-sectional process views each schematically illustrating a method of manufacturing the liquid crystal device. FIG. 5 illustrates definition of a deposition angle.

Figure 4A:
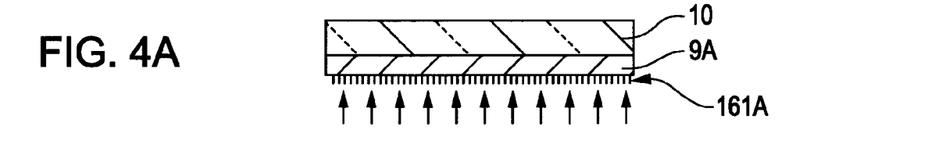
FIG. 4A is a cross-sectional process view schematically illustrating a method of manufacturing a liquid crystal device.
Figure 5:
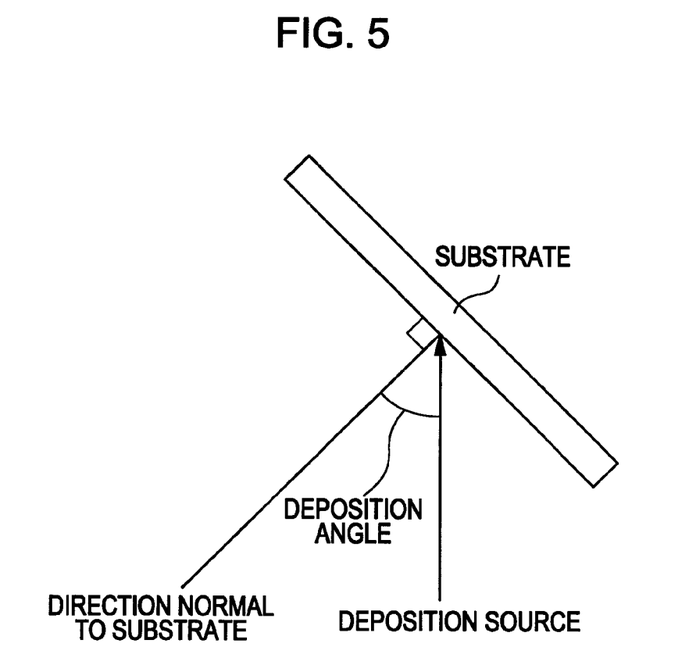
FIG. 5 illustrates definition of a deposition angle.

In order to manufacture the liquid crystal device, the device substrate 10 on which the pixel electrode 9A has been formed is prepared as illustrated in FIG. 4A, and a first inorganic material is deposited by a vapor deposition method or a sputtering method so as to cover the pixel electrode 9A, thereby forming the first inorganic layer 161A. In this case, silicon oxide is employed as the first inorganic material and is deposited in an atmosphere of vacuum of $4 \times 10^{-3}$ pascal at a deposition angle of 0° so as to have a thickness of 20 nm. As illustrated in FIG. 5, the deposition angle used herein is an angle between a direction in which deposited particles or sputtering particles respectively enter the substrate from a deposition source used in a vapor deposition method or from a target used in a sputtering method and a direction normal to the substrate.

Figure 4B:
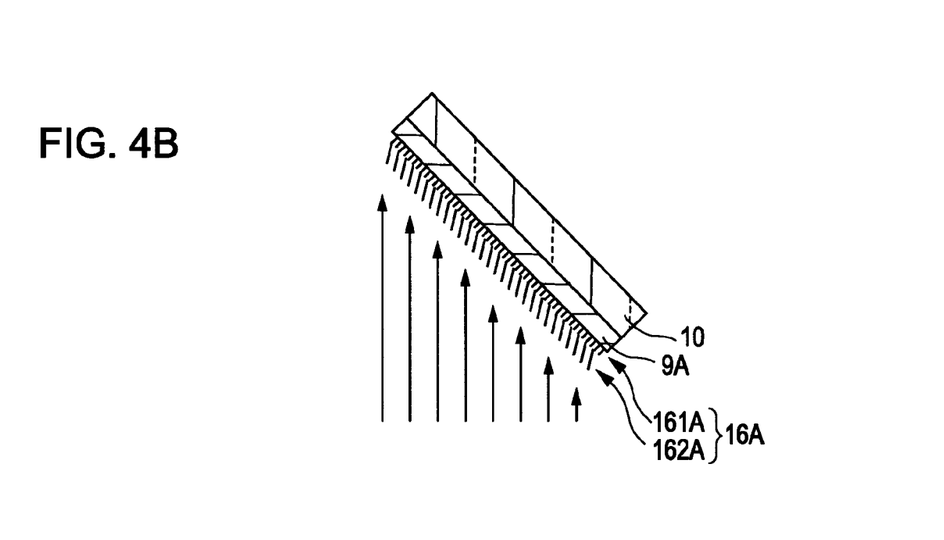
FIG. 4B is a cross-sectional process view schematically illustrating a method of manufacturing the liquid crystal device.

Subsequently, as illustrated in FIG. 4B, an inorganic material is deposited at a deposition angle different from that in the formation of the first inorganic layer 161A so as to cover the first inorganic layer 161A, thereby forming the second inorganic layer 162A. In this case, silicon oxide is deposited in an atmosphere of vacuum of $4 \times 10^{-3}$ pascal at a deposition angle of 48° so as to have a thickness of 60 nm.

Through these processes, the first alignment layer 16A including the first inorganic layer 161A and the second inorganic layer 162A is formed.

Figure 4C:
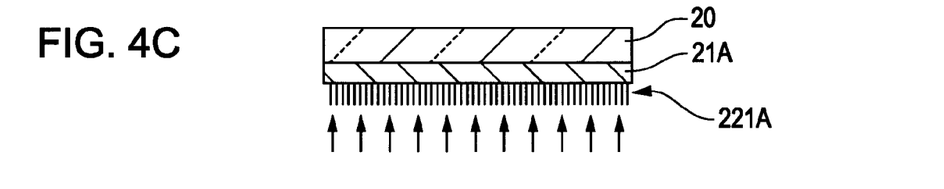
FIG. 4C is a cross-sectional process view schematically illustrating a method of manufacturing the liquid crystal device.

As illustrated in FIG. 4C, the counter substrate 20 on which the common electrode 21A has been formed is prepared, and a second inorganic material is deposited so as to cover the common electrode 21A, thereby forming the third inorganic layer 221A. The second inorganic material may be the same as or different from the first inorganic material. In this case, silicon oxide is employed as the second inorganic material and is deposited in an atmosphere of vacuum of $4 \times 10^{-3}$ pascal at a deposition angle of 0° so as to have a thickness of 60 nm.

Figure 4D:
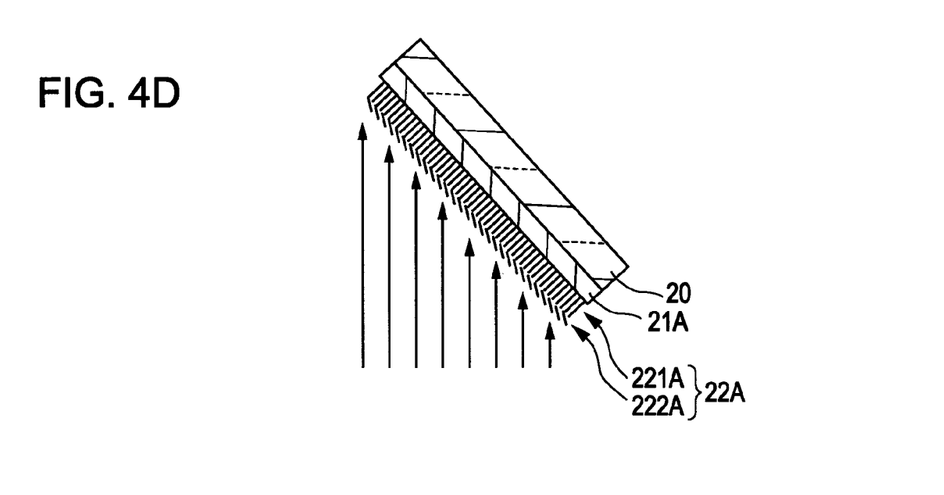
FIG. 4D is a cross-sectional process view schematically illustrating a method of manufacturing the liquid crystal device.

Subsequently, as illustrated in FIG. 4D, an inorganic material is deposited at a deposition angle different from that in the formation of the third inorganic layer 221A so as to cover the third inorganic layer 221A, thereby forming the fourth inorganic layer 222A. In this case, the silicon oxide is deposited in an atmosphere of vacuum of $4 \times 10^{-3}$ pascal at a deposition angle of 48° so as to have a thickness of 20 nm.

Through these processes, the second alignment layer 22A including the third inorganic layer 221A and the fourth inorganic layer 222A is formed.

Sequence of the first process, in which the first alignment layer 16A is formed, and the second process, in which the second alignment layer 22A is formed, is not limited.

Subsequently, in a state in which the device substrate 10 is positioned opposite to the counter substrate 20 such that the first alignment layer 16A faces the second alignment layer 22A, the liquid crystal layer 50 is confined between the device substrate 10 and the counter substrate 20. Furthermore, a polarization plate, a peripheral circuit, or the like is formed, thereby providing a liquid crystal device having the configuration the same as that of the liquid crystal device 100 illustrated in FIGS. 1A and 1B.

According to such a method of manufacturing the liquid crystal device, the different deposition angles and different conditions such as deposition time and the like are employed between the process of forming the first inorganic layer 161A and the process of forming the second inorganic layer 162A, thereby being able to form the first alignment layer 16A. Accordingly, as compared with a typical process of forming an alignment layer, complicated process and the increased number of processes are almost never caused, and therefore the first alignment layer 16A can be efficiently formed. For the same reason, the second alignment layer 22A also can be efficiently formed, and a liquid crystal device in which a flicker or image burning is almost never generated as described above can be efficiently manufactured.

Second Embodiment

A second embodiment of the invention will be described. The second embodiment is different from the first embodiment in that a pixel electrode is formed as a reflecting electrode and is made of a material different from that of a common electrode and in that the thickness ratios of inorganic layers are determined such that an LCcom difference shifts to the side of a positive potential.

Figure 6A:
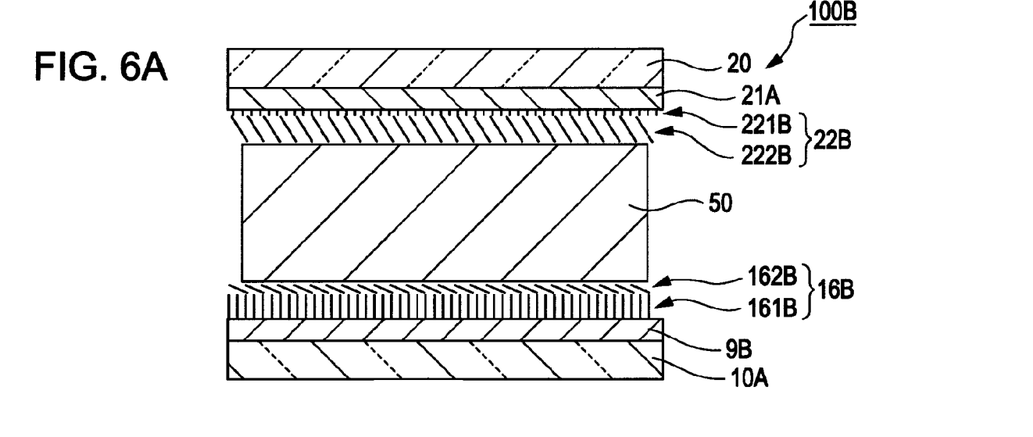
FIG. 6A is a cross-sectional view illustrating alignment layers of a third example according to a second embodiment.
Figure 6B:
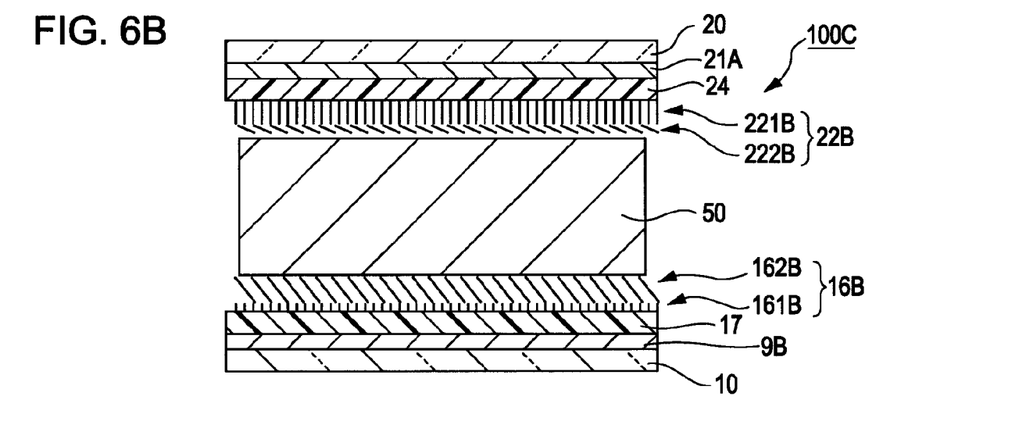
FIG. 6B is a cross-sectional view illustrating alignment layers of a fourth example according to the second embodiment.
Figure 6C:
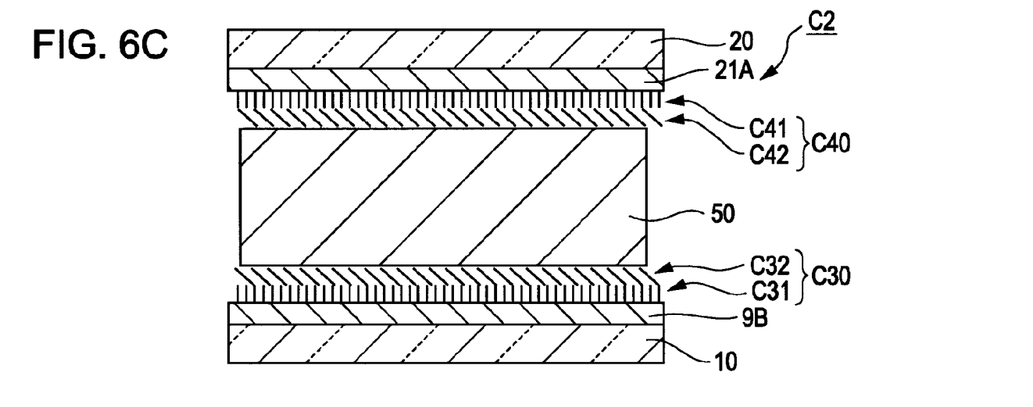
FIG. 6C is a cross-sectional view illustrating alignment layers of a second comparison example.

FIGS. 6A and 6B are cross-sectional views each schematically illustrating first and second alignment layers in respective third and fourth examples according to the second embodiment in an enlarged manner. FIG. 6C is a cross-sectional view schematically illustrating first and second alignment layers in a second comparison example in an enlarged manner.

With reference to FIG. 6A, a liquid crystal device 100B of the third example has the device substrate 10, a pixel electrode 9B, a first alignment layer 16B, the counter substrate 20, the common electrode 21A, a second alignment layer 22B, and the liquid crystal layer 50.

The respective liquid crystal device 100B and 100C of the third and fourth examples are formed as reflective liquid crystal devices. The pixel electrode 9B is made of a light reflective material (aluminum, herein) and functions as a reflecting electrode. The common electrode 21A is made of ITO and functions as a transparent electrode. The first alignment layer 16B includes a first inorganic layer 161B and a second inorganic layer 162B. The second alignment layer 22B includes a third inorganic layer 221B and a fourth inorganic layer 222B. Each of the first to fourth inorganic layers is formed as a result of silicon oxide being deposited by a vapor deposition method and has a column-like structure. The liquid crystal devices 100B and 100C of the second embodiment can be manufactured as a result of employing the manufacturing method described in the first embodiment, and the first to fourth inorganic layers may be formed by a sputtering method.

The first inorganic layer 161B is provided as the under layer of the first alignment layer 16B and is formed on the pixel electrode 9B. In the first inorganic layer 161B, the column-like structure has an orientation angle of approximately 0°. The first inorganic layer 161B has a thickness of approximately 60 nm. The second inorganic layer 162B is provided as the upper layer of the first alignment layer 16B and is formed on the first inorganic layer 161B so as to contact the liquid crystal layer 50. The second inorganic layer 162B has the column-like structure with an orientation angle of approximately 15° and has a thickness of approximately 20 nm.

As described above, the first alignment layer 16B has the thickness of approximately 80 nm. A ratio of the thickness of the second inorganic layer 162B to the thickness of the first inorganic layer 161B is configured as approximately one third. The column-like structure of the first inorganic layer 161B has the orientation angle different from that of the column-like structure of the second inorganic layer 162B. In the first alignment layer 16B, focusing attention on magnitude ratio between the thicknesses of the upper and lower layers, the upper layer has a thickness smaller than that of the lower layer.

The third inorganic layer 221B is provided as the under layer of the second alignment layer 22B and is formed on the common electrode 21A. In the third inorganic layer 221B, the column-like structure has an orientation angle of approximately 0°. The third inorganic layer 221B has a thickness of approximately 20 nm. The fourth inorganic layer 222B is provided as the upper layer of the second alignment layer 22B and is formed on the third inorganic layer 221B so as to contact the liquid crystal layer 50. The fourth inorganic layer 222B has the column-like structure with an orientation angle of approximately 15° and has a thickness of approximately 60 nm.

As described above, the second alignment layer 22B has the thickness of approximately 80 nm. A ratio of the thickness of the fourth inorganic layer 222B to the thickness of the third inorganic layer 221B is configured as approximately three. The column-like structure of the third inorganic layer 221B has the orientation angle different from that of the column-like structure of the fourth inorganic layer 222B. In the second alignment layer 22B, focusing attention on magnitude ratio between the thicknesses of the upper and lower layers, the upper layer has a thickness larger than that of the lower layer.

As described above, the ratio between the thicknesses of the inorganic layers in the second alignment layer 22B is different from the ratio between the thicknesses of the inorganic layers in the first alignment layer 16B. Focusing attention on magnitude ratio between the thicknesses of the upper and lower inorganic layers in each of the first alignment layer 16B and the second alignment layer 22B, the lower layer has a larger thickness in the first alignment layer 16B, and the upper layer has a larger thickness in the second alignment layer 22B. The magnitude ratio between the thicknesses of the upper and lower layers in the first alignment layer 16B is inverted with respect to the magnitude ratio between the thicknesses of the upper and lower layers in the second alignment layer 22B.

With reference to FIG. 6B, the liquid crystal device 100C of the fourth example has the configuration the same as that of the liquid crystal device 100B of the third example except that a passivation layer 17 is provided between the pixel electrode 9B and the first alignment layer 16B and except that a passivation layer 24 is provided between the common electrode 21A and the second alignment layer 22B. The passivation layer 17 is made of an insulating material such as silicon oxide, serves as a flat base of the first alignment layer 16B, and functions to protect the pixel electrode 9B. The passivation layer 17 is formed by, for example, a plasma chemical vapor deposition (CVD) method utilizing tetraethyl orthosilicate (TEOS) gas as source gas.

With reference to FIG. 6C, a liquid crystal device C2 of the second comparison example has the configuration the same as that in the third example except a first alignment layer C30 and second alignment layer C40. The first alignment layer C30 includes a first inorganic layer C31 and a second inorganic layer C32. The second alignment layer C40 includes a third inorganic layer C41 and a fourth inorganic layer C42.

In the second comparison example, the thicknesses of the inorganic layers are different from those of the inorganic layers in the third example. The second comparison example has the configuration the same as that in the third example except such a difference. In the second comparison example, each of the first to fourth inorganic layers has a thickness of approximately 40 nm. In the second comparison example, a ratio of the thickness of the second inorganic layer C32 to the thickness of the first inorganic layer C31 is configured as approximately one, and a ratio of the thickness of the fourth inorganic layer C42 to the thickness of the third inorganic layer C41 is configured as approximately one. Namely, in the second comparison example, the ratio between the thicknesses of the inorganic layers in the first alignment layer C30 (one, herein) is the same as the ratio between the thicknesses of the inorganic layers in the second alignment layer C40 (one, herein).

In the liquid crystal devices of the third example, the fourth example, and the second comparison example individually having the above configurations, LCcom differences were compared with each other under the conditions the same as those in the first example described in the first embodiment. As a result, the liquid crystal device of the second comparison example had an LCcom difference of −0.4 V, whereas the liquid crystal device of the third example had an LCcom difference of −0.1 V, and the liquid crystal device of the fourth example had an LCcom difference of 0.05V. In the case where an identical display pattern was continuously displayed on the liquid crystal device of each of the third and fourth examples for 10 hours, it was confirmed that image burning or a flicker was not visibly recognized.

In general, as compared with a transmissive liquid crystal device, a reflective liquid crystal device is capable of increasing an aperture ratio of a pixel and is capable of decreasing a driving voltage. On the other hand, it is contemplated that a reflecting member such as a reflecting electrode is provided on either of a device substrate or a counter substrate with the result that a difference between adsorbability of impurity ions to the side of the device substrate and adsorbability of the impurity ions to the side of the counter substrate is increased.

In the liquid crystal device of the second embodiment, each of the first and second alignment layers includes the inorganic layers, and the ratio between the thicknesses of the inorganic layers in the first alignment layer is different from the ratio between the thicknesses of the inorganic layers in the second alignment layer. For the same reason described in the first embodiment, in addition to a difference in adsorbability of the impurity ions due to a difference in materials of the pixel electrode 9B and common electrode 21A, a difference between adsorbability of impurity ions to the side of the device substrate 10 and adsorbability of the impurity ions to the side of the counter substrate 20 can be decreased. Therefore, the absolute value of the LCcom difference can be decreased. Accordingly, a flicker or image burning is almost never generated, and a high-quality image is capable of being displayed.

As described in the fourth example, the passivation layer 17 is provided between the pixel electrode 9B and the first alignment layer 16B, and the passivation layer 24 is provided between the common electrode 21A and the second alignment layer 22B, so that the pixel electrode 9B can be protected by the passivation layers. Furthermore, an influence of a difference in materials of the pixel electrode 9B and common electrode 21A on the adsorbability of the impurity ions can be reduced, thereby being able to decrease a difference between adsorbability of impurity ions to the side of the device substrate 10 and adsorbability of the impurity ions to the side of the counter substrate 20.

Third Embodiment

Next, a third embodiment of the invention will be described. The third embodiment is different from the first embodiment in that a ratio between the thicknesses of upper and lower layers in a first alignment layer is the same as a ratio between the thicknesses of upper and lower layers in a second alignment layer while the total thickness of the upper and lower layers in the first alignment layer is different from the total thickness of the upper and lower layers in the second alignment layer.

Figure 7:
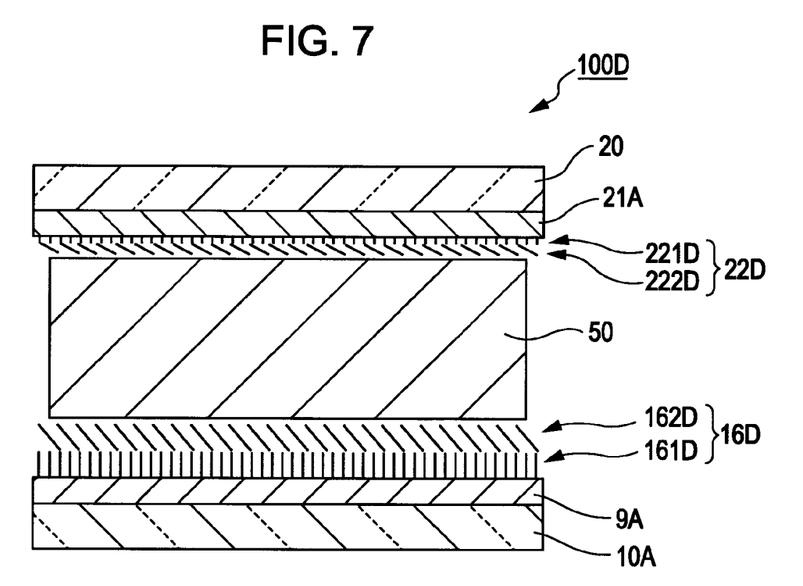
FIG. 7 is a cross-sectional view illustrating alignment layers of a fifth example according to a third embodiment.

FIG. 7 is a cross-sectional view schematically illustrating first and second alignment layers in a fifth example according to the third embodiment in an enlarged manner.

With reference to FIG. 7, a liquid crystal device 100D of the fifth example has the device substrate 10A, the pixel electrode 9A, a first alignment layer 16D, the counter substrate 20, the common electrode 21A, a second alignment layer 22D, and the liquid crystal layer 50. The first alignment layer 16D includes a first inorganic layer 161D and a second inorganic layer 162D. The second alignment layer 22D includes a third inorganic layer 221D and a fourth inorganic layer 222D. The total thickness of the first inorganic layer 161D and second inorganic layer 162D (total thickness of the first alignment layer 16D) is different from that of the third inorganic layer 221D and fourth inorganic layer 222D (total thickness of the second alignment layer 22D). Each of the first to fourth inorganic layers is formed as a result of silicon oxide being deposited by a vapor deposition method and has a column-like structure.

The first inorganic layer 161D is formed on the pixel electrode 9A. In the first inorganic layer 161D, the column-like structure has an orientation angle of approximately 0°. The second inorganic layer 162D is formed on the first inorganic layer 161D and contacts the liquid crystal layer 50. In the second inorganic layer 162D, the column-like structure has an orientation angle of approximately 15°. In this case, the first inorganic layer 161D has a thickness substantially equal to that of the second inorganic layer 162D.

The third inorganic layer 221D is formed on the common electrode 21A. In the third inorganic layer 221D, the column-like structure has an orientation angle of approximately 0°. The fourth inorganic layer 222D is formed on the third inorganic layer 221D and contacts the liquid crystal layer 50. In the fourth inorganic layer 222D, the column-like structure has an orientation angle of approximately 15°. In this case, the third inorganic layer 221D has a thickness substantially equal to that of the fourth inorganic layer 222D.

In the liquid crystal device of the third embodiment, the column-like structure of the first inorganic layer 161D has an orientation angle different from that of the column-like structure of the second inorganic layer 162D. The ratio of the thickness of the second inorganic layer 162D to the thickness of the first inorganic layer 161D is adjusted, so that an influence of the first alignment layer 16D on the adsorbability of the impurity ions in the liquid crystal layer 50 to the side of the device substrate 10A can be adjusted, thereby being able to adjust adsorbability of the impurity ions to the side of the device substrate 10A. The ratio of the thickness of the fourth inorganic layer 222D to the thickness of the third inorganic layer 221D is adjusted, thereby being able to adjust adsorbability of the impurity ions to the side of the counter substrate 20. Furthermore, the total thickness of the first alignment layer 16D is different from that of the second alignment layer 22D, thereby being able to decrease a difference between adsorbability of impurity ions to the side of the device substrate 10A and adsorbability of the impurity ions to the side of the counter substrate 20.

The scope of the invention is not limited to the above embodiments. The above embodiments of the invention can be variously modified without departing from the scope of the invention. For example, in each of the first to fourth examples, the first alignment layer has the total thickness substantially equal to that of the second alignment layer for the purpose of comparison with each of the comparison examples. However, the first alignment layer may have the total thickness different from that of the second alignment layer. Each of the first and second alignment layers may include three or more layers. In this case, the top surface that is disposed near the liquid crystal layer may be configured as the second inorganic layer (or fourth inorganic layer), and the first inorganic layer (or third inorganic layer) may be disposed at the side opposite to the liquid crystal layer with respect to the top surface.

The entire disclosure of Japanese Patent Application No. 2010-015132, filed Jan. 27, 2010 is expressly incorporated by reference herein.

What is claimed is:

1. A liquid crystal device having a liquid crystal layer disposed between a first substrate and a second substrate, the liquid crystal device comprising:

a first alignment layer formed on the first substrate at a side of the liquid crystal layer, the first alignment layer including at least two inorganic layers each having a column-like structure; and a second alignment layer formed on the second substrate at the side of the liquid crystal layer, the second alignment layer including at least two inorganic layers each having a column-like structure, wherein the at least two inorganic layers of the first alignment layer include a first inorganic layer and a second inorganic layer, the second inorganic layer being disposed on the first inorganic layer at the side of the liquid crystal layer so as to contact the liquid crystal layer, the second inorganic layer having the column-like structure with an orientation angle different from an orientation angle of the column-like structure of the first inorganic layer, the at least two inorganic layers of the second alignment layer include a third inorganic layer and a fourth inorganic layer, the fourth inorganic layer being disposed on the third inorganic layer at the side of the liquid crystal layer so as to contact the liquid crystal layer, the fourth inorganic layer having the column-like structure with an orientation angle different from an orientation angle of the column-like structure of the third inorganic layer, and a first ratio of a thickness of the second inorganic layer to a thickness of the first inorganic layer is different from a second ratio of a thickness of the fourth inorganic layer to a thickness of the third inorganic layer.

2. The liquid crystal device according to claim 1, wherein a magnitude of the first ratio of the thickness of the second inorganic layer to the thickness of the first inorganic layer is inverted with respect to a magnitude of the second ratio of the thickness of the fourth inorganic layer to the thickness of the third inorganic layer.

3. The liquid crystal device according to claim 1, wherein
a first adsorbability of impurity ions contained in the liquid crystal layer to a side of the first substrate is different from a second adsorbability of impurity ions to a side of the second substrate, and the first and second ratios of the inorganic layers are set such that a difference between the first adsorbability and the second adsorbability is decreased.

4. The liquid crystal device according to claim 3, further comprising:
a reflecting electrode disposed between the first substrate and the first alignment layer; and a transparent electrode disposed between the second substrate and the second alignment layer, wherein the first and second ratios of the inorganic layers are set such that the difference between the first adsorbability and the second adsorbability due to a difference between a work function of the reflecting electrode and a work function of the transparent electrode is decreased.

5. The liquid crystal device according to claim 4, further comprising passivation layers individually provided between the reflecting electrode and the first alignment layer and between the transparent electrode and the second alignment layer.

6. The liquid crystal device according to claim 1, further comprising a seal material disposed between the first substrate and the second substrate, wherein the first alignment layer does not overlap the seal material.

7. The liquid crystal device according to claim 1, further comprising a seal material disposed between the first substrate and the second substrate, wherein the second alignment layer does not overlap the seal material.

8. A liquid crystal device having a liquid crystal layer disposed between a first substrate and a second substrate, the liquid crystal device comprising:

a first alignment layer formed on the first substrate at a side of the liquid crystal layer, the first alignment layer including at least two inorganic layers each having a column-like structure; and a second alignment layer formed on the second substrate at the side of the liquid crystal layer, the second alignment layer including at least two inorganic layers each having a column-like structure, wherein the at least two inorganic layers of the first alignment layer include a first inorganic layer and a second inorganic layer, the second inorganic layer being disposed on the first inorganic layer at the side of the liquid crystal layer so as to contact the liquid crystal layer, the second inorganic layer having the column-like structure with an orientation angle different from an orientation angle of the column-like structure of the first inorganic layer, the at least two inorganic layers of the second alignment layer include a third inorganic layer and a fourth inorganic layer, the fourth inorganic layer being disposed on the third inorganic layer at the side of the liquid crystal layer so as to contact the liquid crystal layer, the fourth inorganic layer having the column-like structure with an orientation angle different from an orientation angle of the column-like structure of the third inorganic layer, a ratio of a thickness of the second inorganic layer to a thickness of the first inorganic layer is the same as a ratio of a thickness of the fourth inorganic layer to a thickness of the third inorganic layer, and a total thickness of the first inorganic layer and the second inorganic layer is different from a total thickness of the third inorganic layer and the fourth inorganic layer.

9. The liquid crystal device according to claim 8, further comprising a seal material disposed between the first substrate and the second substrate, wherein the first alignment layer does not overlap the seal material.

10. The liquid crystal device according to claim 8, further comprising a seal material disposed between the first substrate and the second substrate, wherein the second alignment layer does not overlap the seal material.

* * * * *